United States Patent
Hassani et al.

(10) Patent No.: US 12,288,413 B2
(45) Date of Patent: Apr. 29, 2025

(54) CAMERA TAMPERING DETECTION

(71) Applicant: Ford Global Technologies, LLC, Dearborn, MI (US)

(72) Inventors: Ali Hassani, Ann Arbor, MI (US); Hafiz Malik, Canton, MI (US); Jonathan Diedrich, Carleton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 558 days.

(21) Appl. No.: 17/326,450

(22) Filed: May 21, 2021

(65) Prior Publication Data
US 2022/0374641 A1 Nov. 24, 2022

(51) Int. Cl.
*G06V 40/10* (2022.01)
*G05D 1/00* (2006.01)
*H04N 25/63* (2023.01)
*H04N 25/67* (2023.01)

(52) U.S. Cl.
CPC .......... *G06V 40/10* (2022.01); *G05D 1/0055* (2013.01); *H04N 25/63* (2023.01); *H04N 25/67* (2023.01)

(58) Field of Classification Search
CPC ........ G06V 40/10; G06V 10/16; G06V 10/30; G06V 40/40; G05D 1/0055; H04N 23/80; H04N 17/002; G06F 21/32
See application file for complete search history.

(56) References Cited

U.S. PATENT DOCUMENTS

| | | | |
|---|---|---|---|
| 6,092,192 A | 7/2000 | Kanevsky et al. | |
| 6,593,963 B1 * | 7/2003 | Safai | H04N 25/00 348/222.1 |
| 6,879,247 B2 | 4/2005 | Shimomura et al. | |
| 6,920,236 B2 | 7/2005 | Prokoski | |
| 7,602,947 B1 | 10/2009 | Lemelson et al. | |

(Continued)

FOREIGN PATENT DOCUMENTS

| CN | 202887210 U | 4/2013 |
|---|---|---|
| CN | 204795370 U | 11/2015 |

(Continued)

OTHER PUBLICATIONS

Fridrich, Jessica. "Digital image forensics." IEEE Signal Processing Magazine 26.2 (2009): 26-37.*

(Continued)

*Primary Examiner* — Xuemei G Chen
(74) *Attorney, Agent, or Firm* — Frank Lollo; Brooks Kushman P.C.

(57) ABSTRACT

A computer, including a processor and a memory, the memory including instructions to be executed by the processor to acquire one or more images from a camera and determine first camera noise values based on the one or more images by determining reactions of camera photo receptors to light. The instructions can include further instructions to compare the first camera noise values with second camera noise values determined based on previously acquired images from the camera and output a tamper determination for the camera based on whether the first camera noise values match, within a tolerance value, the second camera noise values determined based on the previously acquired images from the camera.

20 Claims, 5 Drawing Sheets

(56) References Cited

U.S. PATENT DOCUMENTS

| | | | | |
|---|---|---|---|---|
| 8,160,293 | B1* | 4/2012 | Fridrich | G06V 40/40 |
| | | | | 713/194 |
| 8,300,890 | B1* | 10/2012 | Gaikwad | H04N 5/144 |
| | | | | 382/173 |
| 8,374,404 | B2 | 2/2013 | Williams et al. | |
| 8,718,335 | B2 | 5/2014 | Mason et al. | |
| 8,725,330 | B2 | 5/2014 | Failing | |
| 8,988,219 | B2* | 3/2015 | McCloskey | G08B 29/046 |
| | | | | 340/500 |
| 9,886,640 | B1 | 2/2018 | Chen et al. | |
| 10,169,671 | B2 | 1/2019 | Matsimanis et al. | |
| 10,452,894 | B2 | 10/2019 | Zhang et al. | |
| 10,769,415 | B1 | 9/2020 | Mostafa et al. | |
| 10,868,984 | B1* | 12/2020 | Charlton | H01L 27/14605 |
| 10,990,660 | B2* | 4/2021 | Magli | G06F 18/00 |
| 11,030,470 | B2 | 6/2021 | Han et al. | |
| 11,113,510 | B1 | 9/2021 | Mostafa et al. | |
| 11,178,363 | B1 | 11/2021 | Qian et al. | |
| 11,373,449 | B1 | 6/2022 | Genner | |
| 11,481,883 | B2 | 10/2022 | Wildermuth et al. | |
| 2001/0038717 | A1* | 11/2001 | Brown | G06T 5/002 |
| | | | | 382/268 |
| 2002/0136435 | A1 | 9/2002 | Prokoski | |
| 2006/0001921 | A1* | 1/2006 | Bailey | H04N 25/63 |
| | | | | 348/E5.081 |
| 2006/0102843 | A1 | 5/2006 | Bazakos et al. | |
| 2006/0104488 | A1 | 5/2006 | Bazakos et al. | |
| 2006/0261931 | A1 | 11/2006 | Cheng | |
| 2008/0059027 | A1 | 3/2008 | Farmer et al. | |
| 2009/0232367 | A1* | 9/2009 | Shinzaki | G06V 40/1394 |
| | | | | 382/124 |
| 2009/0257671 | A1* | 10/2009 | Fridrich | G06V 20/80 |
| | | | | 382/275 |
| 2010/0102366 | A1 | 4/2010 | Lee et al. | |
| 2010/0102961 | A1* | 4/2010 | McCloskey | G08B 13/196 |
| | | | | 340/540 |
| 2010/0134250 | A1 | 6/2010 | Chung et al. | |
| 2010/0141770 | A1 | 6/2010 | Gomi | |
| 2010/0201374 | A1 | 8/2010 | Vasilyev et al. | |
| 2010/0208951 | A1 | 8/2010 | Williams et al. | |
| 2012/0154581 | A1* | 6/2012 | Wang | G08B 13/196 |
| | | | | 348/143 |
| 2012/0176810 | A1 | 7/2012 | Galbraith et al. | |
| 2012/0189225 | A1 | 7/2012 | Li | |
| 2012/0230536 | A1* | 9/2012 | Fridrich | G06V 40/40 |
| | | | | 382/100 |
| 2012/0243797 | A1* | 9/2012 | Di Venuto Dayer | |
| | | | | G06V 10/242 |
| | | | | 382/218 |
| 2013/0024123 | A1 | 1/2013 | Ochs et al. | |
| 2013/0077958 | A1 | 3/2013 | Xu et al. | |
| 2013/0311001 | A1 | 11/2013 | Hampiholi | |
| 2013/0342702 | A1 | 12/2013 | Zhang et al. | |
| 2013/0342703 | A1 | 12/2013 | Lin | |
| 2014/0002675 | A1* | 1/2014 | Duparre | H04N 17/002 |
| | | | | 348/187 |
| 2014/0162598 | A1* | 6/2014 | Villa-Real | G07F 7/0886 |
| | | | | 455/411 |
| 2014/0278529 | A1* | 9/2014 | Matos | G16Z 99/00 |
| | | | | 705/3 |
| 2014/0294262 | A1 | 10/2014 | Schuckers et al. | |
| 2014/0307929 | A1 | 10/2014 | Nechyba et al. | |
| 2015/0110418 | A1* | 4/2015 | Bayram | G06T 1/0078 |
| | | | | 382/282 |
| 2015/0281599 | A1 | 10/2015 | Slaby et al. | |
| 2015/0304612 | A1 | 10/2015 | Richards et al. | |
| 2016/0019420 | A1 | 1/2016 | Feng et al. | |
| 2016/0019421 | A1 | 1/2016 | Feng et al. | |
| 2016/0048736 | A1 | 2/2016 | Chu et al. | |
| 2016/0086018 | A1 | 3/2016 | Lemoff | |
| 2016/0206216 | A1 | 7/2016 | Kirenko | |
| 2017/0091550 | A1 | 3/2017 | Feng et al. | |
| 2017/0104916 | A1 | 4/2017 | Mueller | |
| 2017/0242134 | A1* | 8/2017 | Matsuoka | G06T 5/00 |
| 2018/0039845 | A1 | 2/2018 | Chen et al. | |
| 2018/0048474 | A1* | 2/2018 | Landrock | G06F 21/36 |
| 2018/0240216 | A1* | 8/2018 | Dirik | G06F 17/15 |
| 2019/0057268 | A1 | 2/2019 | Burge et al. | |
| 2019/0057502 | A1 | 2/2019 | Wang et al. | |
| 2019/0102873 | A1 | 4/2019 | Wang et al. | |
| 2019/0228248 | A1 | 7/2019 | Han et al. | |
| 2020/0053297 | A1 | 2/2020 | Tokizaki et al. | |
| 2020/0134342 | A1 | 4/2020 | Parupati et al. | |
| 2020/0218772 | A1 | 7/2020 | Zhang et al. | |
| 2020/0250448 | A1 | 8/2020 | Joshi et al. | |
| 2020/0273157 | A1* | 8/2020 | Shao | G06T 1/0028 |
| 2020/0334450 | A1 | 10/2020 | Shen et al. | |
| 2020/0342245 | A1 | 10/2020 | Lubin et al. | |
| 2020/0402223 | A1* | 12/2020 | Ghosh | G06V 10/7557 |
| 2021/0049391 | A1 | 2/2021 | Zou et al. | |
| 2021/0074138 | A1 | 3/2021 | Micko et al. | |
| 2021/0166045 | A1 | 6/2021 | Kwak et al. | |
| 2021/0168347 | A1 | 6/2021 | Margolin et al. | |
| 2021/0192340 | A1* | 6/2021 | Stonehouse | G06N 3/04 |
| 2021/0241014 | A1 | 8/2021 | Choiniere | |
| 2021/0256281 | A1 | 8/2021 | Henson et al. | |
| 2021/0264183 | A1 | 8/2021 | Wolf et al. | |
| 2022/0012511 | A1 | 1/2022 | Rowe | |
| 2022/0084223 | A1* | 3/2022 | Norris | G06T 1/0028 |
| 2022/0284228 | A1 | 9/2022 | Li et al. | |
| 2022/0398820 | A1 | 12/2022 | Abd-Almageed et al. | |
| 2023/0005240 | A1 | 1/2023 | Chen et al. | |
| 2023/0056564 | A1* | 2/2023 | Han | G06V 10/431 |
| 2023/0091865 | A1* | 3/2023 | Chen | G06V 10/30 |
| | | | | 382/118 |
| 2024/0013572 | A1 | 1/2024 | Yang et al. | |

FOREIGN PATENT DOCUMENTS

| | | | |
|---|---|---|---|
| CN | 108319986 A | | 7/2018 |
| CN | 110287672 A | | 9/2019 |
| CN | 111611977 A | | 9/2020 |
| CN | 111738065 A | | 10/2020 |
| WO | WO-2014078696 A2 * | 5/2014 | G06Q 20/042 |
| WO | 2020048140 A1 | | 3/2020 |
| WO | 2021157790 A1 | | 8/2021 |
| WO | 2022134754 A1 | | 6/2022 |

OTHER PUBLICATIONS

Kurosawa, Kenji, et al. "Case studies and further improvements on source camera identification." Media Watermarking, Security, and Forensics 2013. vol. 8665. SPIE, 2013.*

San Choi, Kai, Edmund Y. Lam, and Kenneth KY Wong. "Automatic source camera identification using the intrinsic lens radial distortion." Optics express 14.24 (2006): 11551-11565.*

López-Alonso, José Manuel, and Javier Alda. "Spatial-temporal characterization of noise in web cameras." Photonics, Devices, and Systems II. vol. 5036. SPIE, 2003.*

Akshatha et al. (Akshatha, K. R., et al. "Digital camera identification using PRNU: A feature based approach." Digital investigation 19 (2016): 69-77.*

Chen, Mo, Jessica Fridrich, Miroslav Goljan, and Jan Lukas. "Determining image origin and integrity using sensor noise." IEEE Transactions on information forensics and security 3, No. 1 (2008): 74-90.*

Hu et al., "Heterogeneous Face Recognition: Recent Advances in Infrared-to-Visible Matching", 2017 IEEE 12th International Conference on Automatic Face & Gesture Recognition, DOI 10.1109/FG.2017.126.

Non-Final Office Action dated Oct. 13, 2023 re U.S. Appl. No. 17/326,511, filed May 21, 2021.

Non-Final Office Action for U.S. Appl. No. 17/326,511, filed May 21, 2021, as issued by the USPTO Mar. 9, 2023.

Final Office Action for U.S. Appl. No. 117/326,490, filed May 21, 2021, as issued by the USPTO May 22, 2023.

Friedrich, "Digital Image Forensics", DOI:10.1109/MSP.2008.931078, IEEE, 2009 (Year: 2009).

(56) References Cited

OTHER PUBLICATIONS

Non-Final Office Action dated Jun. 21, 2023 re U.S. Appl. No. 17/326,581, filed May 21, 2021.
Final Office Action dated Jun. 27, 2023 re U.S. Appl. No. 17/326,511, filed May 21, 2021.
Final Office Action for U.S. Appl. No. 17/326,511, filed May 21, 2021, as issued by the USPTO Dec. 29, 2022.
Maser et al., "PRNY-based Detection of Finger Vein Presentation Attacks", DOI:10.1109/IWBF.2019.8739203, 7th IAPR/IEEE International Workshop on Biometrics and Forensics—IWBF2019.
Final Office Action dated Sep. 27, 2023, U.S. Appl. No. 17/326,581, filed May 21, 2021.
Chen et al. "Determining Image origin and Integrity Using Sensor Noise", IEEE Transactions on Information Forensics and Security, vol. 3, No. 1, Mar. 2008.
Debiasi et al. "PRNU-based Detection of Morphed Face Images", 2018 International Workshop on Biometrics and Forensics (IWBF), 2018.
Non-Final Office Action for U.S. Appl. No. 17/326,460 as issued by the USPTO Oct. 19, 2022.
Hermosilla et al., "A comparative study of thermal face recognition methods in unconstrained environments", Pattern Recognition 45 (2012) 2445-2459, doi: 10.1016/j.patcog.2012.01.001.
Kakkirala et al., "Thermal Infrared Face Recognition: A Review", 2017 UKSims-AMSS 19th International Conference on Modelling & Simulation, doi: 10.1109/UKSim.2017.38.
Kkristo et al., "An Overview of Thermal Face Recognition Methods", MIPRO 2018, May 21-25, 2018, Opatija Croatia.
Sanchez-Sanchez et al., "Conventional Neural Network Approach for Multispectral Facial Presentation Attack Detection in Automated Border Control Systems", Entropy 2020, 22, 1296, www.mdpi.com/journal/entropy, doi: 10.3390/e22111296.
Spinoulas et al., "Multispectral Biometrics System Framework: Application to Presentation Attack Detection", arXiv:2006.07489v1, Jun. 12, 2020.
Steiner et al., "Reliable Face Anti-Spoofing Using Multispectral SWIR Imaging", 978-1-5090-1869-7/16, copyright 2016 IEEE.
Non-Final Office Action dated Aug. 12, 2022 re U.S. Appl. No. 17/326,511, filed May 21, 2021.
Non Office Action for U.S. Appl. No. 17/326,490, filed May 21, 2021, as issued by the USPTO Jan. 23, 2023.
Nagendran, N. et al., "Security and Safety With Facial Recognition Feature for Next Generation Automobiles," International Journal of Recent Technology and Engineering (IJRTE), vol. 7 Issue-4S, Nov. 2018, 6 pages.
Scherhag, U. et al., "Detection of Face Morphing Attacks based on PRNU Analysis," IEEE Transactions on Biometrics, Behavior, and Identity Science (T-BIOM), Oct. 2019, 16 pages.
Mohd Norzali, et al., "Internal State Measurement From Facial Stereo Thermal and Visible Sensors Through SVM Classification," ARPN Journal of Engineering and Applied Sciences, Jan. 2015, 8 pages.
Kim, et al. "A Motion and Similarity-Based Fake Detection Method for Biometric Face Recognition Systems," IEEE Transactions on Consumer Electronics, vol. 57, No. 2, May 2011, 7 pages.
Angelopoulou, E., "The Reflectance Spectrum of Human Skin," University of Pennsylvania, Scholarly Commons, Department of Computer & Information Science, Dec. 20, 1999, 16 pages.
Anderson, R, et al., "The Optics of Human Skin," The Journal of Investigative Dermatology, vol. 77, No. J, 1981, 7 pages.
Cooksey, C., et al., "Reflectance Measurements of Human Skin," National Institute of Standards and Technology, Oct. 27, 2020, 3 pages.
Barnes, P. et al., "Spectral Reflectance," U.S. Department of Commerce, Technology Administration, National Institute of Standards and Technology, Mar. 1998, 164 pages.
Mhou, K. et al., "Face Spoof Detection Using Light Reflection in Moderate to Low Lighting," 2nd Asia-Pacific Conference on Intelligent Robot Systems, 2017, 6 pages.
Jacquez, J. et al., "Spectral Reflectance of Human Skin in the Region 0.7-2.6," http://jap.physiology.org/, Sep. 13, 2016, 3 pages.
Cooksey, C. et al., "A collection and statistical analysis of skin reflectance signatures for inherent variability over the 250 nm to 2500 nm spectral range," National Institute of Standards and Technology, Jun. 4, 2014, 2 pages.
Akshatha, K.R., et al., "Digital camera identification using PRNU: A feature based approach," Science Direct, Digital Investigation, Nov. 3, 2016, 9 pages.
Non-Final Office Action for U.S. Appl. No. 17/326,581, filed May 21, 2021, as issued by the USPTO Jan. 19, 2024.
Notice of Allowance dated Feb. 6, 2024 re U.S. Appl. No. 17/326,511, filed May 21, 2021.

\* cited by examiner

CAMERA TAMPERING DETECTION

BACKGROUND

Computer-based operations performed on image data can depend upon having a verified source of image data for successful operation. Computer-based security operations include facial recognition, a type of biometric authentication where an image of a human face is used to determine an identity of a person seeking access to a vehicle, building or device, such as a computer or smart phone. Computer-based vehicle operation can include a computing device in a vehicle acquiring image data from sensors included in the vehicle and processing the image data to determine a vehicle path upon which to operate the vehicle. Successful performance of computer-based image processing operations can depend upon verifying the source of image data.

DETAILED DESCRIPTION

Figure 1:
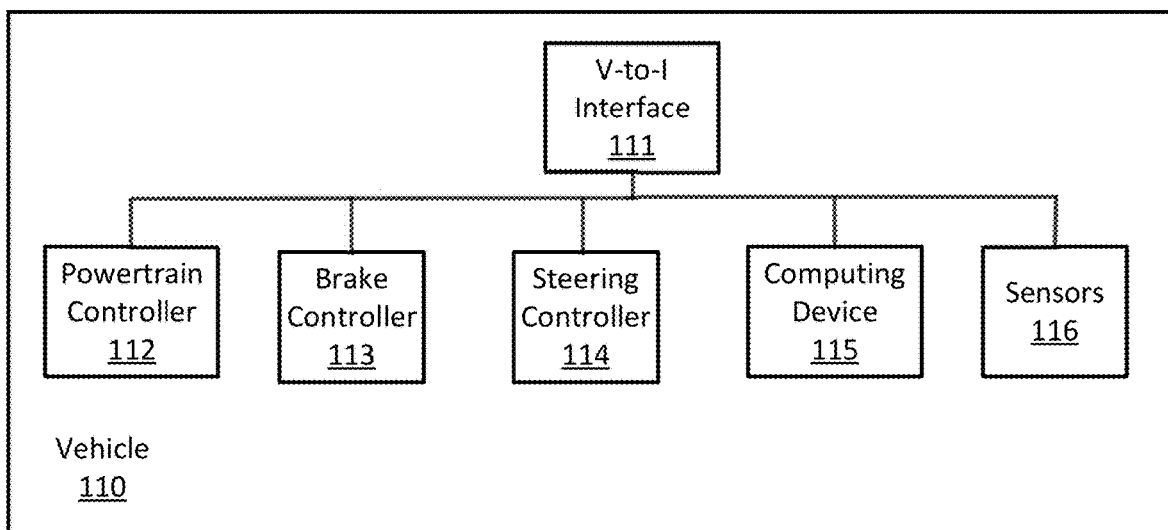
FIG. 1 is a diagram of an example vehicle.

Computer-based operations performed on image data can depend upon having a verified source of image data for successful operation. Successful operation is operation of a computer-based system that achieves the design goals of the system. For example, a biometric authorization system should permit authorized people access and deny access to unauthorized people. An autonomous vehicle system should operate a vehicle without contacting other vehicles or objects such as buildings. Successful operation of security tasks such as biometric authorization and vehicle tasks such as autonomous or semi-autonomous operation can depend upon verifying that the image data being process was acquired by a specific camera. For example, an unauthorized user can attempt to gain access to a vehicle, building, or device by substituting an image of an authorized user from a different source than the camera included in the security system. In another example, an autonomous vehicle could be forced to travel to an unauthorized location by substituting images of a different location for the images being acquired by the vehicle's cameras. Techniques discussed herein can permit successful operation of computer-based image processing systems by detecting camera tampering, where camera tampering means unauthorized substitution of camera hardware or image data.

Biometric authentication can be used to control access to buildings, homes, or vehicles, and can be used to grant permission to operate computers, cell phones, or other devices. Biometric authentication software can be executed on a computing device included in the location or device being accessed, or the image data can be uploaded to a cloud-based server that maintains a database of trained models for execution. An example of biometric authentication software is facial identification software, for example Face Tracker. Face Tracker is a facial recognition software library written in C++ and available on facetracker.net under the MIT software license. Biometric authentication software can be executed on a computing device included in the location or device being accessed, or the image data can be uploaded to a cloud-based server that maintains a database of trained models for execution. The results of performing the biometric authentication can be downloaded to the device seeking authentication and permission to access a vehicle, vehicle controls, an area including a building or a room or a device including a computer or a cell phone can be granted or denied.

Biometric facial recognition typically operates by calculating physiological characteristics of a human face and comparing the calculated physiological characteristics to stored physiological characteristics from the trained model. Physiological characteristics can include measures of facial features such as the distance between pupils, distance between corners of the mouth and length of nose, etc. These measures can be normalized by forming ratios of the measurements and stored as the trained model. At challenge time, an image of the human seeking access is acquired and processed to extract physiological characteristics which are then compared to stored physiological characteristics to determine a match. Successful authentication can be used to unlock a vehicle door or enable vehicle controls. In other examples, successful authentication can be used for security applications such as access to a location or room by unlocking a door, or yet further alternatively or additionally access to a device such as a computer by enabling input devices like a keyboard or mouse or granting access to files.

As biometric authentication technology has advanced, techniques for tampering with camera data to fool a biometric authentication system into authenticating a deceptive fake (spoofing) have advanced also. For example, neural networks can be used to generate "deep fake" images and videos, where one person's likeness can be edited onto another person's body, a person's appearance can be transplanted into a scene they have never inhabited made, or a person can be made to appear as if they were speaking words they never spoke in real life. Counterfeit images determined based on skilled manual image processing or deep fake technology can spoof a biometric authorization system based on facial recognition and thereby grant access to an unauthorized person to access to a vehicle, vehicle controls, a building, a computing device or a cell phone.

A vehicle can be operable in autonomous ("autonomous" by itself in this disclosure means "fully autonomous"), semi-autonomous, and occupant piloted (also referred to as non-autonomous) mode. A computing devices in a vehicle can receive image data regarding the operation of the vehicle from vehicle sensors including cameras. The computing device may operate the vehicle in an autonomous mode, a semi-autonomous mode, or a non-autonomous mode based on processing image data acquired by vehicle sensors including cameras. A computing device in a vehicle can use image data to detect objects such as other vehicles, pedestrians, traffic signs or barriers, etc. in an environment around the vehicle. Image processing software included in the computing device can depend upon receiving that includes expected pixel intensities for correct operation of the image processing software. Camera tampering such as authorized substitution of a different camera for an expected camera or substituting video data from another source can cause the image processing software to arrive at an incorrect result, e.g., not detecting a pedestrian in a field of view of the camera, for example. Detecting camera tampering can detect unauthorized data being introduced into a vehicle operation system.

Techniques discussed herein detect camera tampering by identifying deviations from an intrinsic property of image data acquired by a given camera. An intrinsic property of the image data includes distributions of noise in the image data. Techniques discussed herein determine camera fixed pattern noise by measuring the reactions of camera photo receptors, also referred to as photo sites, to light. Techniques discussed herein can detect visually deceptive fakes while advantageously using computing resources efficiently enough to run in real time on vehicle computing systems. Techniques discussed herein use camera noise characterization to create a binary classification of untampered versus tampered images. Relevant noise distribution can be determined based on photo response non-uniformity (PRNU), for example. PRNU can be used to create an expected noise "fingerprint" for identification of an image that includes a particular person. While machine learning faking algorithms can become visually deceptive, the noise "fingerprint" remains intrinsic to the imager and a portion of the image that includes the person's face. Techniques discussed herein improve vehicle biometric authentication by detecting camera tampering, in particular camera tampering that includes a counterfeit image of a person.

Another technique for determining a camera noise "fingerprint" is to measure camera dark current noise. Camera dark current noise is a measure of the amount of current generated by a camera photosite in the absence of any light stimulation falling on the photosite. A photosite is the portion of a camera sensor that converts incoming light to electrical current. Dark current noise is thermal noise resulting from electrons spontaneously generated within the camera sensor caused by valence electrons being thermally excited into the conduction band. The variation in the number of dark electrons collected during an exposure is the dark current noise. Dark current noise is independent of the signal level but is dependent on the temperature of the sensor. Each photosite included in a sensor can have a characteristic level of dark current noise which can be combined to identify a particular camera.

Camera dark current noise data can be acquired by masking off a small number of sensor photosites, typically along one or more edges of the sensor to ensure that no light will fall on the photosites. When an image from the camera is acquired, the masked off photosites will show up in the image as dark pixels. By acquiring a long exposure image, sufficient thermal electrons will be generated in the masked off portions of the image to permit measurement of the dark current noise. Because thermal electrons obey Poisson statistics, the dark current noise corresponding to the current generated by the thermal electrons is the square root of the pixel value. The current generated by the thermal electrons is also a function of temperature so the temperature of the sensor can be measured to determine a temperature factor to be multiplied times the pixel values to compensate for temperature. The resulting dark current noise values for the masked off pixels can be combined to be compared to subsequently acquired dark current noise values or retained as an array of pixels to be correlated with subsequently acquired dark current noise values.

A counterfeit image of a person can be made by obtaining an image of a person authorized to access a vehicle from a different camera source other than a camera included in the vehicle. Presentation of counterfeit images to a biometric authorization system can be referred to in this context at camera tampering. Techniques discussed herein can improve biometric authorization systems by determining one or more distributions of image noise in a portion of an image that includes a human face to determine camera tampering. For example, when camera tampering is detected, techniques discussed herein will prevent image data from being output for use in biometric authentication. Techniques disclosed herein can also determine a fakeness score which indicates a probability that the image presented to the biometric authorization system was acquired by the same camera as was previously used to acquire the enrollment image. The fakeness score can be multiplied by a score output from a subsequent biometric authentication system to determine an overall probability that person in the challenge image corresponds to the same person in the enrollment image.

Techniques discussed herein can determine camera tampering by processing images from a camera to determine one or more distributions of camera noise values for a region of an image and comparing the distributions of camera noise values to previously determined distributions of camera noise values based on a previously acquired image from the same camera. As discussed above, camera noise can be measured by PRNU or dark current noise. PRNU measures a camera's fixed pattern noise, where pattern point noise is a measure of the response of a pixel to a uniform light stimulus. PRNU can be determined for each pixel corresponding to a photoreceptor in the camera. The photoreceptor can be optically filtered using a red, green, or blue mosaic filter or can be a visible light or near infrared grayscale pixel. Existing techniques for detecting camera tampering include machine learning techniques or data driven techniques. Machine learning techniques can detect camera tampering by analyzing images to detect blurriness on the edges of tampered regions using deep neural networks trained for that purpose, for example. Data driven techniques form databases of tampered images and try to detect camera tampering by matching images to images in the database of tampered images. PRNU distribution comparison can be a more reliable measure of camera tampering than either machine learning techniques or data driven techniques. PRNU or dark current matching can also be determined using fewer computing resources than either machine learning techniques or data driven techniques.

Vehicles, buildings and devices can be equipped with computing devices, networks, sensors, and controllers to acquire and/or process data regarding the environment and to permit access to the vehicle based on the data. For example, a camera in a vehicle or building can be programmed to acquire an image of an approaching user and, upon determining the identity of the user based on facial recognition software, unlock a door to permit the user to enter. Likewise, cameras included in the interior of a vehicle or a device can acquire one or more images of a user and, upon determining the identity of the user based on facial recognition software, accept commands from the human to operate the vehicle or device.

FIG. 1 is a diagram of a vehicle 110 including a computing device 115 and sensors 116. The computing device (or computer) 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer, e.g., a cloud server, via a network, which, as described below, includes hardware, firmware, and software that permits computing device 115 to communicate with a remote server computer via a network such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH®, Ultra-Wide Band (UWB),® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer or user mobile device.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to share data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, lidar, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
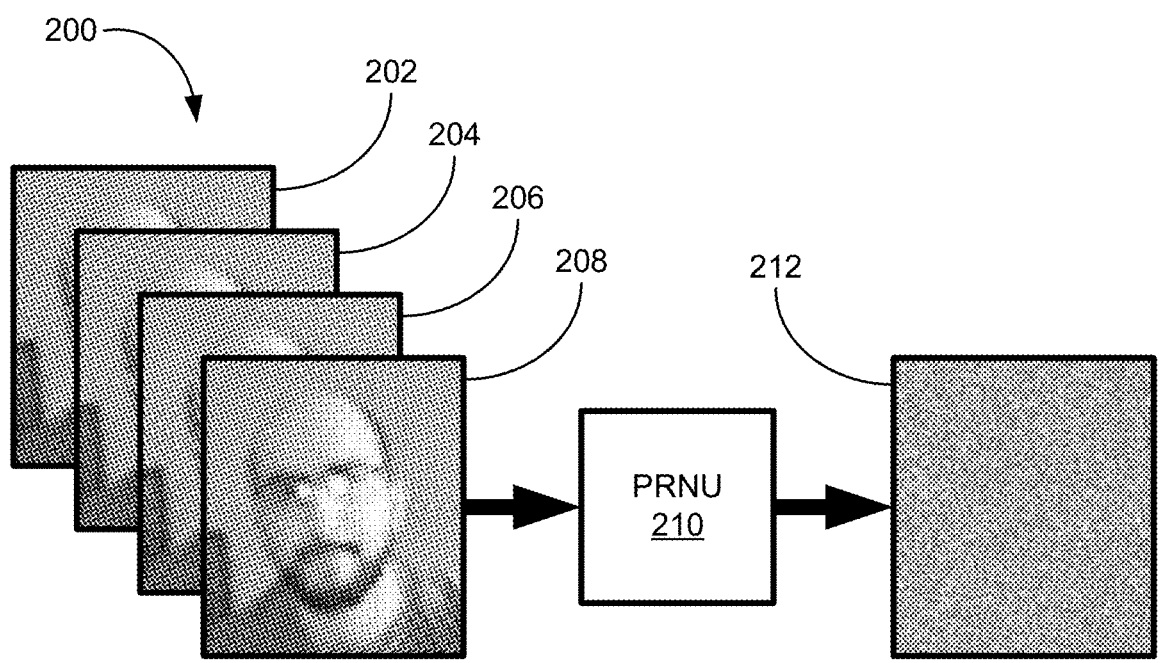
FIG. 2 is a diagram of example camera noise determination.

FIG. 2 is a diagram of example PRNU determination. PRNU for image data can be determined based on image data acquired by the sensors 116 included in a vehicle and communicated to a computing device 115 for processing. FIG. 2 illustrates one or more images 200, in this example four images 202, 204, 206, 208, acquired by sensors 116 included in a vehicle and input to PRNU block 210, which can be a software program executing on computing device 115. PRNU block 210 determines an unbiased estimator 17 for each pixel location in the input one or more images 200 according to the equation:

$$\hat{K} = \frac{\sum_i^m w_i I_i}{\sum_i^m (I_i)^2} \quad (1)$$

Where $I_i$ is a pixel value of the i-th image and $W_i$ is noise residual of the i-th image determined by filtering the i-th image with a de-noising filter, such as a wavelet filter or a smoothing filter to form a filtered image $I_i^{(O)}$ and then subtracting the filtered image $I_i^{(O)}$ from the unfiltered image $I_i$ to form the noise residual $W_i = I_i - I_i^{(O)}$. PRNU can be characterized by determining statistics based on the unbiased estimator $\hat{K}$, for example a mean and a first moment or variance, where pixels of the output image 212 are combined to determine a mean and a variance of the unbiased estimators $\hat{K}$ over the one or more input images 200 for each pixel an image $I_i$. Higher order statistics, including second moment or skewness and third moment or kurtosis can also be calculated based on unbiased estimator $\hat{K}$ and included in the PRNU. Variance is a measure of the width of a distribution about a mean. Skewness is a measure of how symmetric the distribution is about the mean. Kurtosis is a measure of how flat or peaked a distribution is. PRNU values such as mean, variance, skewness and kurtosis can also be calculated for each color in a red, green, blue (RGB) color image rather than or in addition to calculating variance, skewness, and kurtosis based on a grayscale image. Calculating PRNU values for mean, variance, skewness, and kurtosis for each color in an RGB image can yield twelve output values based on output image 212 from PRNU block 210.

An overall PRNU score for the one or more images 200 can be determined by combining each of the output images from the PRNU block 210 into a single value. For example, pixels of the output image 212 can be combined by averaging to determine a mean and a variance over the output image 212. A PRNU score based on a PRNU mean or variance value can identify the camera that acquired the one or more images 200 and determine whether the one or more images 200 have been altered after being acquired with the camera. Additional sensitivity and specificity can be obtained by basing the PRNU score on a skewness value and a kurtosis value. Sensitivity in this context is measured by a size of a region of an image, i.e., a greatest sensitivity corresponds to determining the smallest region within the one or more images 200 that can be detected as being altered. Specificity means determining the identity of an individual camera in addition to being able to identify the make and model. When PRNU scores are based on skewness and kurtosis in addition to variance, PRNU scores are a tensor that includes four elements. In examples where PRNU scores are determined for red, green, and blue channels, PRNU scores are a tensor including twelve elements. Mean, variance, skewness, and kurtosis can also be determined for camera dark current noise and the same techniques for comparing PRNU values can be used to compare camera dark current noise statistics. Camera noise statistics can be based on PRNU statistics or dark current statistics.

Once the camera noise scores for one or more images 200 are determined as described above, the camera noise scores can be compared to previously determined camera noise scores for the particular camera being tested for tampering. camera noise scores are compared by matching the individual scores in the tensor corresponding to the one or more images 200 acquired from the camera to previous camera noise scores for that camera. If the camera noise scores match within a tolerance value, the camera is determined to be not tampered with and the one or more images 200 can be output to a software program executing on a computing device 115 in a vehicle 110 for further processing, for example biometric authentication. Tolerance values can be determined empirically by determining a plurality of camera noise scores and calculating a standard deviation for each type of camera noise score. Matching in this context means that an acquired camera noise score is within a predetermined amount, e.g., one standard deviation, of a previously acquired camera noise score to be considered a successful match. In other examples the one or more images can be divided into a plurality of zones and camera noise scores determined for one or more of the zones.

Determining camera noise values as described herein can improve determining camera tampering by permitting camera tampering to be determined based on one or more images 200 without requiring that the one or more images 200 be acquired using special targets or lighting. Previous technique for determining camera noise values can require that one or more images be acquired while the camera field of view includes sinusoidal patterns that provide a grayscale image at specified levels of intensity, for example. Furthermore, previous techniques had difficulty determining camera tampering when one or more sets of one or more images camera noise used to distinguish one or more cameras included the same objects illuminated with the same lighting. Techniques described herein provide a binary classification technique for camera tampering detection. Based on matching camera noise values within tolerances, techniques described herein determine that a camera has not been tampered with, and image data from the camera can be further processed without fear of counterfeit images being processed, or the camera has been tampered with and no processing should be undertaken with the camera data.

Figure 3:
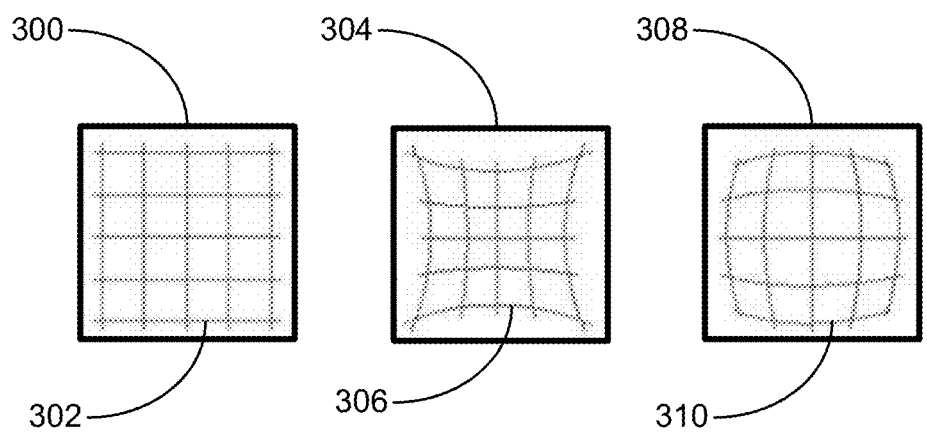
FIG. 3 is a diagram of example lens distortion.

FIG. 3 is diagram of example lens distortion. In techniques discussed herein, camera tampering detection can be performed by determining lens aberration. Lens aberration is distortion introduced into an image by the camera optics including one or more lenses. Image 300 is an image including a grid pattern 302 acquired from a real world grid pattern by a camera having no lens distortion. The grid pattern 302 appears in image 300 very much like it appears in the real world grid pattern, with straight horizontal and vertical lines. Image 304 is an image including a grid pattern 306 acquired from the same real world grid pattern as image 300 by a camera having pincushion lens distortion. Some of the straight lines in grid pattern 306 appear curved, where the curvature depends upon the location of the line with respect to the center of the image 304. Image 308 is an image including a grid pattern 310 acquired from the same real world grid pattern as image 300 by a camera having barrel lens distortion. Some of the straight lines in grid pattern 310 appear curved, where the curvature depends upon the location of the line with respect to the center of the image 308. Cameras can have other types of lens distortion, including, perspective distortion, skew distortion, curved horizon distortion and panorama distortion, for example. What all these types of lens distortion have in common is that the geometry of objects in the field of view of the camera are distorted in systematic fashion.

Lens distortion is an unchanging aspect of particular camera optics. Lens distortion does not change unless the camera optics are changed. If the camera optics remains unchanged, and the camera optics include measurable lens distortion, the lens distortion can be used to detect camera tampering. Determining camera tampering can include determining lens aberration by comparing geometry of objects in the one or more images to geometry of object in one or more previously acquired images from the camera. For example, a first image can be acquired that includes a particular object, where the object can be a straight line such as a door frame, a geometric shape such as a traffic sign, or a human face. At a later time, a second image can be acquired by the same camera and lens to be used for biometric authentication, for example, the image can be checked to see if one or more of the same objects are included in same locations with respect to the center of the image. If so, the geometry of the objects can be used to confirm that the lens distortion of the camera has remained unchanged. For example, if the first image includes a straight line that has been transformed into a curved line by lens distortion, the second image must include a straight line with the same degree of curvature.

Human facial feature extraction can be used as a technique for detecting changes in lens distortion between two images acquired by a camera at two different times. A library of machine vision techniques for extracting human facial features is included in Dlib, a toolkit containing machine learning algorithms and tools for creating complex software in C++. Dlib is available at Github.com and is available on an open source license which permits its use free of charge. Human facial features include features such as the inner and outer corners of eyes, corners of the mouth, and edges of the nose, etc. These features can be reliably extracted from images of a human face and the ratios of distances between features will be the same in repeated images of the same person. Human facial feature can be extracted from the first and second images and ratios of distances between features determined. Assuming the same person is being imaged, if the lens distortion of the first image is the same as the lens distortion of the second image, the ratios of the distances between features will be the same. Detecting a difference in the ratios of distances in the two images of the same human face can detect camera tampering by detecting a difference in lens distortion.

Camera tampering can also be detected using principal component analysis to determine camera identity based on acquired one or more images 200. Principal component analysis assumes that each frame or image of a series of N images F is a random variable that includes M pixels:

$$F=\{F_1,F_2,\ldots F_1\} \quad (2)$$

Each frame $F_t$ is assumed to include pixels corresponding to the same portion of a scene which means that any differences between corresponding pixels of the frames F is due to camera noise. The noise can be analyzed by calculating a covariance matrix S equal to the differences between pixels over the frames F. The covariance matrix S can be diagonalized using eigenvectors to form principal components $Y_a$ according to the equation:

$$Y_a = \Sigma_t^N e_{t,\alpha} F_t \quad (3)$$

Where $e_{t,\alpha}$ is the t-th component of eigenvector α. The principal components can be divided into three groups, fixed pattern noise (FPN), interaction noise (IN), and temporal noise (TN). FPN corresponds to the image data that occurs in all of the frames F, i.e. the image of the scene in the field of view of the sensor. IN is image noise corresponding to image artifact introduced into the image by the camera data acquisition process and is correlated with regions of the frames F where the pixel data varies the most. For example, cameras that compress image data before transmitting the image data to a computing device 115 for decompression introduce pattern noise related to the compression/decompression process. TN is image noise corresponding to random image noise related to electronic noise and photon quantum noise.

Calculation of the principal components $Y_\alpha$ produces the principal components $Y_\alpha$ in the order in which the components account for variation in the frames F. Principal component analysis decomposes image data into an n-dimensional component space, wherein each component corresponds to a linear equation that best fits the image data including noise. The FPN components account for most of the variation in pixel values, followed by IN components and finally TN components. Variance in the IN components and the TN components can be determined by measuring the squared differences between the values of IN and TN for each pixel in the series of N frames with respect to the mean and the variances averaged to get overall IN and TN scores for the series of images and therefore the camera. The IN and TN scores can be compared to IN and TN scores previously obtained for the camera to determine whether the camera has been tampered with. Any change in IN or TN scores greater than an empirically determined tolerance will indicate that the camera may have been tampered with and therefore any image data acquired from the camera should not be trusted for biometric authorization or autonomous vehicle operation.

Figure 4:
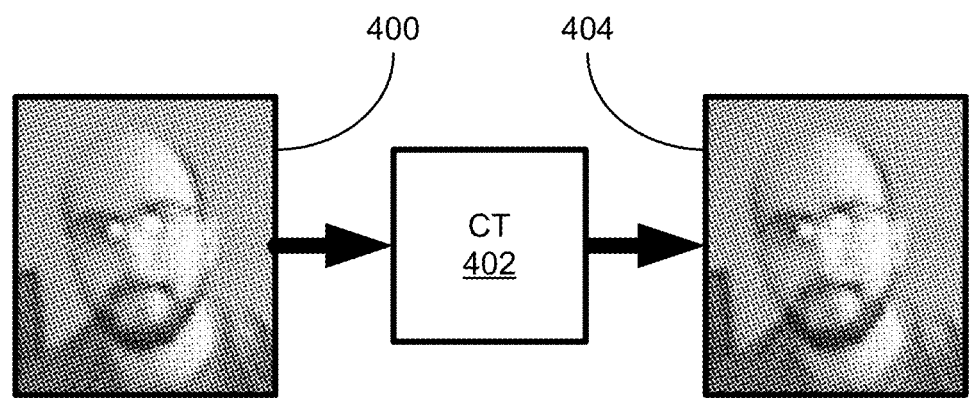
FIG. 4 is a diagram of example camera tampering determination.

FIG. 4 is a diagram of a camera tampering detection system 402. A camera tampering detection system 402 can be software executing on a computing device 115. The computing device 115 can be included in a vehicle 110 or can be a cloud-based server computer. An image 400 acquired by sensors 116 can be communicated to a computing device 115 included in a vehicle 115 or communicated to a cloud-based server computer for processing, for example. Camera tampering detection system 402 can input one or more images 400 and determine camera tampering based on camera noise calculations or lens aberration as described above in relation to FIGS. 2 and 3. Upon determining that the camera has not been tampered with, camera tampering system 402 can output the one or more images 404 for further processing. Output images 404 can be used for biometric authentication, vehicle operation or security applications, for example.

Following calculation of the up to 12 images that include camera noise values, the images that include camera noise values can be compared to images of camera noise values obtained at enrollment time using correlation. Enrollment in this context refers to determining a camera noise profile by calculating camera noise values for a given camera. The enrollment camera noise values can be compared to challenge camera noise values obtained at a later time to determine camera tampering by correlation of the two sets of camera noise values. Correlation is an operation that multiplies each number of a first image times each number of a second image and sums while moving the first image center with respect to the second image center. Following the multiplications and summations the maximum value can be normalized and selected as the correlation coefficient. The one or more correlations coefficients can be averaged to determine an overall correlation coefficient ρ. A fakeness score F can be determined by according to the calculation:

$$F=1-\alpha\times\rho(\text{enrollment,challenge}) \quad (4)$$

Where enrollment includes the images that include the camera noise values from the enrollment images and challenge includes the images that include the camera noise values from the challenge images. ρ( ) is the correlation function discussed above and α is a scalar constant that can be determined empirically by acquiring and testing a plurality of real and counterfeit images.

Determination of camera tampering by calculating a fakeness score F for an image from a camera can be improved by reducing the resolution of the image. Resolution of an image can be reduced without reducing the accuracy of the fakeness score F by forming a reduced resolution image by performing ½ by ½ down sampling of the image by using every other pixel in the x and y direction. This results in an image with ¼ the number of pixels, thereby reducing the number of calculations required to determine the fakeness score F by a factor of four. Depending upon the amount of image noise present, an image can be down sampled to ¹⁄₁₆ of the original number of pixels (¼×¼ down sampling) without changing the fakeness score F. The amount of down sampling to use can be determined empirically by comparing down sampled fakeness scores F for original images vs. down sampled images to determine which level of down sampling to employ for a given camera. Techniques discussed herein can improve camera tampering detection by down sampling image data to reduce computing time and resources required to calculate fakeness scores F.

Following determination of a fakeness score F for an image 400, the image 400 can be passed to a biometric authorization system executing on a computing device 115. The biometric authorization routine can include facial identification software. Facial identification software can determine two sets of facial features corresponding to a challenge image and an enrollment image and determine ratios of distances between features. Facial identification software can determine a facial identification score by determining a match value with previously determined facial identification features. The facial identification score can be combined with a fakeness score to determine a fakeness confidence score. A user authentication status can be determined by comparing the fakeness confidence score to a threshold. The threshold can be determined empirically by acquiring a plurality of real and fake images 400, determining fakeness scores F and facial identification scores for the real and fake images 400 and determining a threshold based on the fakeness confidence scores for the plurality of real and fake images 400.

Facial features include locations on a facial image such as inner and outer corners of the eyes and corners of the mouth. For example, facial feature detection routines such as SURF in the Dlib image processing library can determine locations on a face corresponding to facial features such as the center of each eye and the center of a mouth. The facial identification software can compare the ratios based on the two sets of features and determine a match value. If the ratios between sets of features match, meaning that they have the same value within an empirically determined tolerance, the person in the challenge image is determined to be the same person as in the previously acquired enrollment image. A match value can be determined by determining a mean squared difference between the two sets of ratios. Matching the ratios of distances can reduce the variance in facial feature measurements caused by differences due to differences in distances from the camera and differences in poses between the two images. A facial identification score can be determined using an equation similar to equation (2), above, substituting the match value for the correlation function and determining a value for a that maps the match score to the interval (0,1), with values close to 1 corresponding to a good match and values close to 0 corresponding to a poor match.

A fakeness confidence score for biometric authorization can be determined by multiplying the fakeness score by the facial identification score. A fakeness confidence score can be used to determine a user authentication status. A fakeness confidence score greater than a threshold can indicate that the challenge image was likely not a counterfeit and the challenge was a good match for the enrollment image, therefore the user authentication status should be "authenticated" and access to a vehicle, building, or device can be granted to the user. A fakeness confidence score less than the threshold can indicate that either the challenge image was likely a counterfeit or that the facial identification score indicated that the challenge image did not match the enrollment image or both, and therefore user authentication status should be set to "not authenticated" and access to the vehicle, building or device should not be granted to the user. A fakeness confidence score less than the threshold can indicate problems with either the fakeness score or facial identification score, i.e., a counterfeit image passed facial identification, or a real image failed facial identification. In either case access to the vehicle, area, or computer should be denied. An example threshold for determining a successful fakeness confidence score in one example is 0.5, and in general can be determined empirically based on testing the system with a plurality of real and counterfeit images.

Combining fakeness scores and facial identification scores to determine a fakeness confidence score as described herein can improve biometric authorization by detecting counterfeit images that can successfully pass biometric authorization. Determining a fakeness score based on a single image zone that includes the center of a human face permits the fakeness score to be determined with far fewer computer resources than previous techniques that require processing an entire image to determine camera tampering.

A fakeness score F can also be used to determine camera tampering for an image 400 used operate a vehicle 110. As discussed above in relation to FIG. 1, an image 400 from a camera included in a vehicle 110 can be used by a computing device 115 to operate the vehicle 110. Camera tampering can cause image processing software included in a computing device 115 to output an erroneous result. For example, changing a camera in a vehicle for a different camera with a different resolution and response to light can cause pixel values corresponding to objects in images to change enough to prevent image processing software from detecting the objects. In other examples image data from a different camera can be substituted for image data from an original camera for nefarious purposes, for example to cause a vehicle 110 to contact an object. Detecting camera tampering by determining a fakeness score F can prevent erroneous operation of a vehicle 110 due to camera tampering.

In examples where camera tampering has been detected, camera tampering detection system 402 does not output, i.e., prevents outputs of, images 404 and no further image processing is performed. In examples where camera tampering is detected by camera tampering detection system 402, authentication can be performed using other techniques. For example, if biometric authentication is being used to provide access to a vehicle and camera tampering detection system 402 detects camera tampering and prohibits biometric authorization by not outputting images 404, accessing the vehicle using a non-biometric access technique can indicate that a user is authorized to access the vehicle. In examples where the tamper determination indicates that the first camera noise value does not match the second camera noise value, the second camera noise value can be updated based on successful non-biometric access. Non-biometric access techniques can include a passcode, which can be a numeric or alphanumeric sequence, a key, or a fob. A fob is an electronic device that can transmit a signal to a vehicle via wireless near field communications, for example BLUETOOTH or the like, that can unlock and lock vehicle doors, etc. Unlocking a vehicle using a passcode, a key, or a fob is prima facia evidence of authorization and in this example, the camera noise data obtained by camera tampering detection system 402 using techniques discussed above in relation to FIGS. 2 and 3 can be stored in memory of a computing device 115 included in the vehicle to be used to test against in future camera tampering detection. In other examples, the camera noise data corresponding to the latest camera noise calculation can be stored in memory of a computing device 115 upon each successful authorization, whether from biometric authorization, passcode, key or fob entry. In this fashion, slow changes in camera noise over time due to equipment aging or optics degradation can be tracked by the camera tampering detection system.

A potential challenge facing a camera tampering detection system 402 is in-camera processing performed by processors included in a camera. An example of in-camera processing includes flat field compensation, where a camera acquires one or more images of a flat or uniform field at one or more intensity levels and uses the acquired image data to correct variances in pixel data before the image is sent to a computing device 115, for example. Performing flat field correction can make analysis of image noise according to techniques discussed herein more difficult by compensating for pixel differences before the computing device 115 can acquire and analyze the data. Techniques discussed herein can overcome this challenge by programming the camera to periodically transmit one or more images acquired by periodically defeating flat field compensation. Defeating flat field compensation means temporarily turning the process that performs the calculation off, so that image data is transmitted by the camera un-compensated. The camera can be programmed to indicate to a computing device 115 which frames of image data are transmitted with the flat field compensation defeated.

Figure 5:
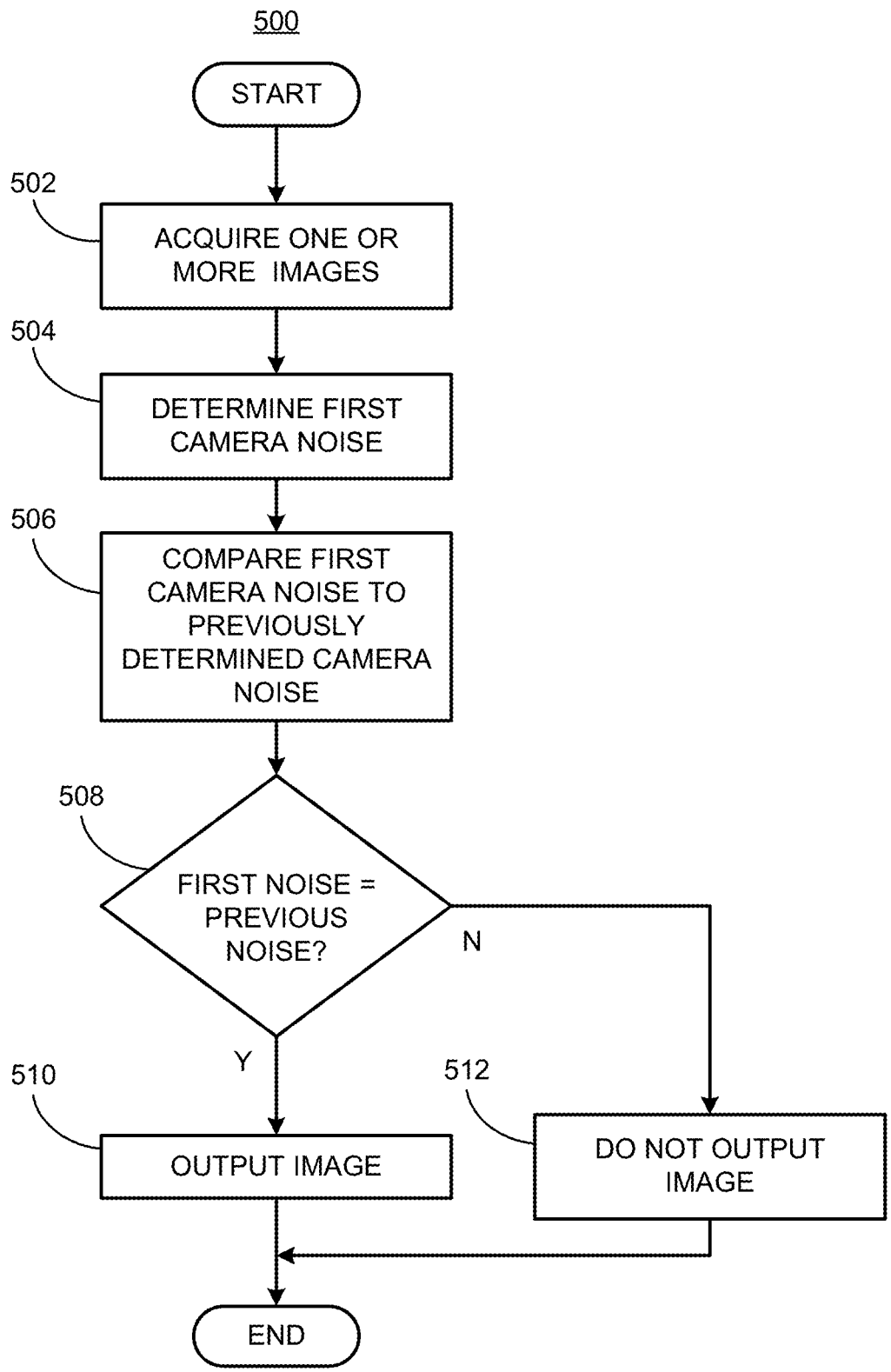
FIG. 5 is a flowchart diagram of an example process to determine camera tampering.

FIG. 5 is a diagram of a flowchart, described in relation to FIGS. 1-4, of a process 500 for detecting camera tampering. Process 500 can be implemented by a processor of a computing device such as a computing device 115, taking as input information from sensors, and executing commands, and outputting object information, for example. Process 500 includes multiple blocks that can be executed in the illustrated order. Process 500 could alternatively or additionally include fewer blocks or can include the blocks executed in different orders.

Process 500 begins at block 502, where a computing device 115 acquires one or more images with a camera. As discussed above, these images do not require presentation of a predetermined pattern or lighting but should be within previously determined grayscale values with sufficient detail to permit calculation of image noise values.

At block 504 the computing device 115 determines a first camera noise. The first camera noise can be determined by determining PRNU, lens aberration, or principal component analysis as discussed above in relation to FIGS. 2 and 3.

At block 506 the computing device 115 the computing device 115 compares the first camera noise values with previously acquired camera noise values for the camera. The camera noise values can include mean, variance, skewness, and kurtosis measures and can be applied to red, green, and blue channels of an RGB color image. Comparing the camera noise values from the acquired one or more images (challenge images) to camera noise values determined based on previously acquired images (enrollment images) can include comparing the camera noise values to determine matches within empirically determined tolerances. The camera noise values can also be compared by correlation to determine the correlation between the two sets of camera noise values.

At block 508 the comparison between first and second sets of camera noise values is checked to determine which block to pass to next. If the first camera noise values match the previously acquired camera noise values within a tolerance value, process 500 passes to block 510. If the first camera noise values do not match the previously acquired camera noise values within a tolerance value, process 500 passes to block 512.

At block 510, the first images have been determined to match the previously acquired images and the first camera is determined to not be tampered with. Images from the first camera can be output by the computing device 115 to be used for biometric authentication or operation of a vehicle 110. For example, computing device 115 in vehicle 110 can include biometric authentication software that processes an image received from sensors 116 to determine an identity of a human to grant or deny access to the vehicle. At block 510 process 500 has determined that one or more images from the sensor have not been tampered with and therefore correspond to the scene in the field of view of the sensor, i.e., a human face included in the one or more images corresponds to the human face in the field of view of the sensor. Camera tampering detection as performed by process 500 detects and prevents spoofing a biometric authentication process by substituting an image or portion of an image of a human face acquired from a different sensor, possibly at a different time. At block 510 one or more images from a vehicle sensor 116 can be output to a biometric authentication process that grants access to a vehicle, for example by unlocking a door based on identifying a human face in the one or more images. Likewise, in examples where computing device 115 uses the one or more images received from sensor 116 for operation of a vehicle 110, for example object avoidance, at block 510 one or more images can be output to a process executing on computing device 115 that operates a vehicle 110. For example, computing device 115 can operate a vehicle by controlling powertrain, steering and/or brakes to avoid a pedestrian or other vehicle detected in the one or more images. Following block 510, process 500 ends.

At block 512, the first images have been determined to not match the previously acquired images and the first camera is determined to be tampered with. Images from the first camera cannot be output by the computing device 115 to be used for biometric authentication or operation of a vehicle 110. Preventing the output of images from the first camera can prevent biometric authentication from being spoofed by substitution of tampered images that include a human face that is not actually in the field of view of vehicle sensors 116 i.e., one or more fake images. Likewise, operation of a vehicle 110 based on possibly fake objects in the one or more images can be prevented upon detection of camera tampering by not outputting the one or more images. Following block 512, process 500 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising:
   a processor; and
   a memory, the memory including instructions executable by the processor to:
   acquire one or more images from a camera;
   determine first camera noise values based on the one or more images by determining reactions of camera photo receptors to light;
   compare the first camera noise values with second camera noise values determined based on previously acquired images from the camera by determining covariance matrices based on the one or more images of the camera and the previously acquired images from the camera, diagonalizing the covariance matrices to determine eigenvectors, and determining first and second camera noise values that include interaction noise principal components and temporal noise components of the eigenvectors;
   output a tamper determination for the camera based on whether the first camera mean and variance values of the noise values match, within a tolerance value, the second camera mean and variance values of the noise values determined based on the previously acquired images from the camera; and
   when the tamper d ion indicates that the first camera noise values do not match the second camera noise values, within a tolerance value, update the second camera noise values based on successful non-biometric access.

2. The computer of claim 1, the instructions including further instructions to, when the tamper determination indicates that the first camera noise values match the second camera noise values, within a tolerance value, output images from the camera.

3. The computer of claim 1, the instructions including further instructions to, when the tamper determination indicates that the first camera noise values do not match the second camera noise values, within a tolerance value, do not output images from the camera.

4. The computer of claim 1, the instructions including further instructions to, when the tamper determination indicates that the first camera noise values match the second camera noise values, output one or more images from the camera for use in one or more of biometric authentication and autonomous vehicle operation.

5. The computer of claim 1, wherein the one or more images are acquired by periodically defeating flat field compensation in the camera.

6. The computer of claim 1, the instructions including further instructions to determine the first camera noise values by determining photo-response non-uniformity values $\hat{K}$ by the equation $\hat{K} = \sum_{i=1}^{m} W_i I_i / \sum_{i=1}^{m} (I_i)^2$ where $I_i$ is the i-th image acquired by the camera and $W_i$ is the noise residual of the i-th image.

7. The computer of claim 1, the instructions including further instructions to determine the first camera noise values by determining camera dark current.

8. The computer of claim 1, wherein determining camera tampering includes determining lens aberration by comparing geometry of an object in the one or more images to geometry of the object in one or more previously acquired images from the camera.

9. The computer of claim 1, wherein determining the first camera noise values includes determining one or more components of a principal component analysis that decomposes image data into an n-dimensional component space, wherein each component corresponds to a line that best fits the image data including noise.

10. The computer of claim 9, wherein determining the first camera noise values includes determining components of the principal component analysis that correspond to interaction noise corresponding to image artifact introduced into the image by acquisition of the one or more images.

11. The computer of claim 9, wherein determining the first camera noise values includes determining components of the principal component analysis that correspond to temporal noise corresponding to random image noise related to electronic noise and photon quantum noise included in the one or more images.

12. The computer of claim 1, wherein the second camera noise is updated based on determining a successful non-biometric access, wherein non-biometric access techniques include a passcode, a key, or a fob.

13. A method comprising:
acquiring one or more images from a camera;
determining first camera noise values based on the one or more images by determining reactions of camera photo receptors to light;
comparing the first camera noise values with second camera noise values determined based on previously acquired images from the camera by determining covariance matrices based on the one or more images of the camera and the previously acquired images from the camera, diagonalizing the covariance matrices to determine eigenvectors, and determining first and second camera noise values that include interaction noise principal components and temporal noise components of the eigenvectors;
output a tamper determination for the camera based on whether the first camera mean and variance values of the noise values match, within a tolerance value, the second camera mean and variance values of the noise values determined based on the previously acquired images from the camera; and
when the tamp nation indicates that the first camera noise values do not match the second camera noise values, within a tolerance value, update the second camera noise values based on successful non-biometric access.

14. The method of claim 13, further comprising, when the tamper determination indicates that the first camera noise values match the second camera noise values, within a tolerance value, output images from the camera.

15. The method of claim 13, further comprising, when the tamper determination indicates that the first camera noise values do not match the second camera noise values, within a tolerance value, do not output images from the camera.

16. The method of claim 13, further comprising, when the tamper determination indicates that the first camera noise values match the second camera noise values, output one or more images from the camera for use in one or more of biometric authentication and autonomous vehicle operation.

17. The method of claim 13, wherein the one or more images are acquired by periodically defeating flat field compensation in the camera.

18. The method of claim 13, further comprising determining the first camera noise values by determining photo-response non-uniformity values $\hat{K}$ by the equation $\hat{K} = \Sigma_{i=1}^{m} W_i I_i / \Sigma_{i=1}^{m} (I_i)^2$ where $I_i$ is the i-th image acquired by the camera and $W_i$ is the noise residual of the i-th image.

19. The method of claim 13, further comprising determining the first camera noise values by determining camera dark current.

20. The method of claim 13, wherein determining camera tampering includes determining lens aberration by comparing geometry of an object in the one or more images to geometry of the object in one or more previously acquired images from the camera.

* * * * *

UNITED STATES PATENT AND TRADEMARK OFFICE
CERTIFICATE OF CORRECTION

PATENT NO. : 12,288,413 B2
APPLICATION NO. : 17/326450
DATED : April 29, 2025
INVENTOR(S) : Ali Hassani et al.

It is certified that error appears in the above-identified patent and that said Letters Patent is hereby corrected as shown below:

In the Claims

Column 16, Line 30, Claim 1:   Delete "d ion" and replace with --determination--; and Column 18, Line 5, Claim 13:   Delete "tamp nation" and replace with --tamper determination--.

Signed and Sealed this
Twenty-fourth Day of June, 2025

Coke Morgan Stewart
*Acting Director of the United States Patent and Trademark Office*